United States Patent
Matthias et al.

(10) Patent No.: US 10,035,267 B2
(45) Date of Patent: Jul. 31, 2018

(54) ROBOT SYSTEM AND METHOD FOR CONTROLLING A ROBOT SYSTEM

(71) Applicant: ABB Schweiz AG, Baden (CH)

(72) Inventors: Bjoern Matthias, Bad Schoenborn (DE); Christoph Winterhalter, Bad Nauheim (DE); Hao Ding, Ladenburg (DE)

(73) Assignee: ABB Schweiz AG, Baden (CH)

( * ) Notice: Subject to any disclaimer, the term of this patent is extended or adjusted under 35 U.S.C. 154(b) by 84 days.

(21) Appl. No.: 15/235,141

(22) Filed: Aug. 12, 2016

(65) Prior Publication Data

US 2016/0346926 A1 Dec. 1, 2016

Related U.S. Application Data

(63) Continuation of application No. PCT/EP2014/000393, filed on Feb. 13, 2014.

(51) Int. Cl.
*B25J 9/10* (2006.01)
*B25J 9/16* (2006.01)

(52) U.S. Cl.
CPC .......... *B25J 9/1676* (2013.01); *B25J 9/1697* (2013.01); *G05B 2219/40202* (2013.01); *G05B 2219/40409* (2013.01); *G05B 2219/40414* (2013.01)

(58) Field of Classification Search
CPC ...... B25J 9/1676; B25J 9/1697; B25J 11/008; B25J 19/023; G05B 2219/40202;
(Continued)

(56) References Cited

U.S. PATENT DOCUMENTS 9,043,025 B2 * 5/2015 Brooks .................. B25J 9/1676
700/245
2009/0171505 A1 * 7/2009 Okazaki ................ B25J 9/1676
700/258
(Continued)

FOREIGN PATENT DOCUMENTS

DE 102004030144 A1 7/1962
DE 10320343 A1 12/2004
WO WO 2009155946 A1 12/2009

OTHER PUBLICATIONS

Thiemermann S: "Direkte Mensch-Roboter-Kooperation in der Kleimteilmontage mit einem SCARA-Roboter", Direkte Mensch-Roboter-Kooperation in der Kleinteilmontage mit Einem SCARA-Roboter; [IPA-IAO Forschung und Praxis], Jost-Jetter Verlag, Heimsheim, Germany, pp. 1-122, Feb. 17, 2005 (Feb. 17, 2005), XP002523808, Retrieved from the Internet: URL:http://elib.uni-stuttgart.de/opus/volltexte/2005/2244/pdf/Thiemermann_hs.pdf [retrieved on Apr. 16, 2009] p. 46, line 15—p. 48, last line p. 51, paragraph 1—p. 52, paragraph 2 p. 63, line 1—p. 82, last line.
(Continued)

*Primary Examiner* — Dalena Tran
(74) *Attorney, Agent, or Firm* — Leydig, Voit & Mayer, Ltd.

(57) ABSTRACT

A robot system, and method for controlling it, for collaborative robot applications has a movable robot arm and a controller, wherein the controller is provided to control the movement of the distal end of the robot arm along a movement path according to at least a sequence of coordinate data and respective commands of a robot program and wherein the controller is provided to determine exact movement speed and course of the movement path between consecutive coordinates according to a set of parameters. At least two alternatively selectable sets of parameters are
(Continued)

provided which both are related to a respective individual comfort level of a respective collaborative human worker.

16 Claims, 4 Drawing Sheets

(58) Field of Classification Search
CPC ........... G05B 2219/40409; G05B 2219/40414; Y10S 901/01; Y10S 901/28; Y10S 901/46; Y10S 901/47
USPC ...... 700/255, 245, 259, 258, 264; 901/1, 15, 901/28; 701/23, 25, 28; 318/574, 568.12
See application file for complete search history.

(56) References Cited

U.S. PATENT DOCUMENTS

| | | | | |
|---|---|---|---|---|
| 2014/0135984 A1* | 5/2014 | Hirata | .................... | B25J 9/1676 700/255 |
| 2014/0316570 A1* | 10/2014 | Sun | ........................ | B25J 9/1674 700/255 |

OTHER PUBLICATIONS

International Preliminary Report on Patentability of PCT/EP2014/000393, dated Aug. 16, 2016, pp. 1-10.

\* cited by examiner $$F_a = \frac{1}{N}\sum_{i=1}^{N} b_i \qquad b_1 = \left(\frac{a}{a_{max}}\right) \in [0,1]$$

$$b_2 = \left(\frac{x_{min}}{x}\right) \in [0,1]$$

$$F_g = \left\{\prod_{i=1}^{N} b_i\right\}^{\frac{1}{N}} \qquad b_3 = \left(\frac{v}{v_{max}}\right) \in [0,1]$$

Definition

- Style parameters:
  - Minimum distance between TCP and Operator: MinDistC
  - Max. TCP velocity: MaxVelC
  - Max. TCP acceleration: MaxAccC
  - Max. TCP jerk: MaxJerkC
  - Max. joint velocity: MaxVelJ
- Style 0: normal operation
  - MinDistC = 1
  - MaxVelC = 1
  - MaxAccC = 1
  - MaxJerkC = 1
  - MaxVelJ = 1

Operator Preference Setup

- Style 1
  - MinDistC = 0.5
  - MaxVelC = 0.5
  - MaxAccC = 0.9
  - MaxJerkC = 0.9
  - MaxVelJ = 0.9
- Style 2
  - MinDistC = 0.5
  - MaxVelC = 0.5
  - MaxAccC = 0.1
  - MaxJerkC = 0.1
  - MaxVelJ = 0.1

Definition

- Obstacle position
  - psObs.x
  - psObs.y
  - psObs.z
- Robot TCP motion
  - Start: p10
  - Goal: p20

Style Selection

Case 1: ActivateStyle 0
- SmoothMoveL p10, p20, v1000, z50, tool0

Case 2: ActivateStyle 1
- SmoothMoveL p10, p20, v1000, z50, tool0

Case 3: ActivateStyle 2
- SmoothMoveL p10, p20, v1000, z50, tool0

ROBOT SYSTEM AND METHOD FOR CONTROLLING A ROBOT SYSTEM

CROSS-REFERENCE TO RELATED APPLICATIONS

This application is a bypass continuation of International Application No. PCT/EP2014/000393, filed on Feb. 13, 2014, which is incorporated by reference herein in its entirety. The International Application was published in English on Aug. 20, 2015, as WO 2015/120864 A1 under PCT Article 21(2).

FIELD

The invention is related to a robot system for collaborative robot applications.

BACKGROUND

Several working tasks, for example in production, comprise rather complex working steps as well as other working steps which are not as demanding. Whilst the non-demanding working steps typically are suitable to be automated by robots, the complex working steps are not necessarily accessible for automation by robots. Robot systems for human robot collaboration are known which take advantage of robot automation in those cases also, wherein the complex working steps are performed by a human worker and the non-demanding working steps are performed by a robot in a collaborative task.

Typical industrial robots have a rated power of several kilowatts and endanger every person in their working range therewith when in operation. Thus for non-collaborative robot systems safety mechanism are foreseen, which cause an emergency stop of the robot when a person is entering a safety area around the robot. Robot systems for collaborative robot applications on the other hand require the presence of a human worker within the working range of the robot, for example to hand over a work piece or such. To ensure the safety of the human worker in those cases also, different security approaches are known. One possibility is to use an inherently safe robot, which is not able at all to harm a human worker due to a limited rated power for example. Other possibilities consist in reducing the movement speed of the robot to a safe level or in installing a vision system for detecting critical situations and preventing them accordingly.

Present collaborative robot application systems as such, even though they are correctly designed according to risk assessment, may still be experienced as unpleasant by the human worker and do not consider the individual comfort level of a human. Some human workers might have a certain anxiety if the robot performs a fast movement, other human workers might feel uncomfortable when the robot is moving at a rather close distance to them. Also, a certain pose of a robot might be perceived as threatening by a human worker. The comfort level of the collaborative human worker is reduced therewith dependent on his individual sensation.

Disadvantageous within this state of the art is that a reduced comfort level might lead to serious health problems of the collaborative human worker over the time, for example. But also an increased error rate or a reduced working speed of the human during work might be the result.

SUMMARY

An aspect of the invention provides a robot system for one or more collaborative robot applications, the system comprising: a movable robot arm; and a controller, wherein the controller is configured to control movement of a distal end of the robot arm along a movement path according to at least a sequence of coordinate data and respective commands of a robot program, wherein the controller is configured to determine exact movement speed and course of the movement path between consecutive coordinates according to a set of parameters, and wherein at least two alternatively selectable sets of parameters are provided, which both are related to a respective individual comfort level of a respective collaborative human worker.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following:

FIG. 7 shows an example for definition of parameter sets in robot program; and

FIG. 8 shows an example for definition of motion execution in robot program.

DETAILED DESCRIPTION

Figure 1:
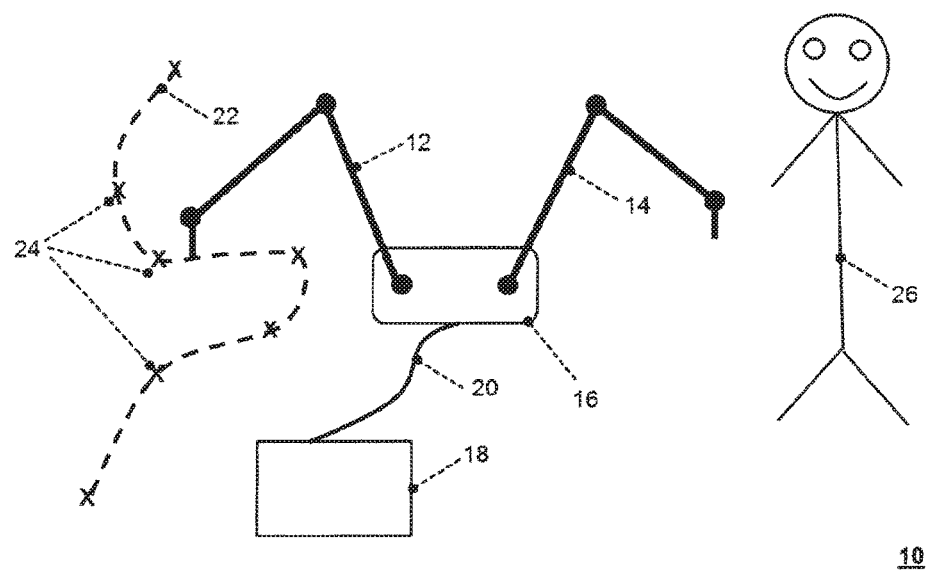
FIG. 1 shows an exemplary robot system for collaborative applications.

An aspect of the invention is related to a robot system for collaborative robot applications, comprising a movable robot arm and a controller, wherein the controller is equipped to control the movement of the distal end of the robot arm along a movement path according to at least a sequence of coordinate data and respective commands of a robot program, wherein the controller is equipped to determine exact movement speed and course of the movement path between consecutive coordinates according to a set of parameters. An aspect of the invention is also related to a method for controlling a robot system.

An aspect of the invention is to provide a robot system for collaborative robot applications which improves the comfort level of human workers and to provide a respective operating method of such a system.

A problem is solved by a robot system of the aforementioned kind. This is characterized in that at least two alternatively selectable sets of parameters are provided which both are related to a respective individual comfort level of a respective collaborative human worker.

The basic idea of an aspect of the invention is to introduce a certain degree of intentional operational tolerance when executing a robot program. A robot program typically comprises data about consecutive coordinates and data about a respective desired movement speed of the distal end of the robot arm or of the tool center point (TCP). Assuming a linear interpolation of the sections of the movement path in between consecutive coordinates, a robot program determines a fully defined movement path and a respective movement speed, which gives no room for any deviation therefrom. According to the invention, it is also possible to define a respective zone around respective coordinates, wherein the robot arm is not necessarily approaching the coordinate while moving within such a zone. Moreover, it is also possible to scatter the movement path within such a zone so that the connection to the subsequent section of the movement path will be smooth.

By introducing alternative, selectable, and individual comfort-related parameter sets, the operational tolerance can be used for individually increasing the comfort level of a collaborative human worker. A parameter of such a parameter set typically describes a physical parameter, which might have influence on the individual sensation of a human worker, wherein the robot controller is equipped to interpret the parameter set in such a way, that movement path and movement speed of the robot arm are adapted according to the individual comfort level of a respective collaborative human worker within the operational tolerance. A robot controller is a computing unit which is provided to interpret commands of a robot program and initiate a respective movement of the different drives of the robot.

Typically a robot program is defined such that the initially defined movement path and the initially defined movement speed are set as demanding as possible from the technical point of view, wherein all safety regulations are of course always observed. Thus in a typical case without considering any comfort level, the robot speed will be set as high as reasonable and the trajectory as short as possible, so that the robot task will be performed as fast as is feasible. By applying the comfort-related parameter set thereon, the movement of the robot arm might become individually and intentionally less demanding and the comfort level of the human worker will increase therewith.

A value of a comfort-related parameter is typically selectable within a range inbetween a lower and an upper limit. In case of the movement speed of the robot arm, for example, a lowering of the upper limit to a slower speed will probably increase the comfort level for most of the collaborative human workers. On the other side, there might be an individual sensation of some workers, which feel most comfortable with a higher movement speed.

Another comfort-related parameter is the closest distance of the robot arm to a collaborative human worker while passing him. In this case, the lower limit of the parameter is the essential value for an individual comfort feeling. Due to safety reasons, at least a minimum distance may need to be observed. It can be assumed that, at least for some of the collaborative human workers, an increased distance is individually felt as more comfortable. Increasing the distance probably will increase the length of the movement path of the robot arm and the cycle time will also increase therewith.

Anyhow, since in a typical human robot collaboration task only one robot is collaborating with only one human, an increase of the cycle time due to an increased comfort level will not have any impact on any other tasks.

Preferably an individual parameter set is provided for each respective collaborative human worker. Thus, the robot movement behavior easily can be adapted to the needs of a respective collaborative human worker by selecting and applying the respective individual parameter set.

According to a preferred embodiment of the invention, the respective parameters are provided to adopt a value between a given lower and a given upper limit. Upper and lower limits are defined in such a way that, while all safety aspects are fulfilled, the collaboration task is still efficient enough even in case of the highest comfort level. In an example, the speed can only become reduced to a minimum value such as 30% or the like to ensure a minimum degree of efficiency.

According to a further embodiment of the invention, the robot controller is equipped to interpret a dedicated command of the robot program for selecting a respective set of parameters. This might be a command such as "Activate Style 1", "Activate Style 2" or the like, so that a respective set of parameters behind the selected variants easily can become activated. Each style might be associated with a certain human collaborative worker and reflect his individual preferences concerning comfort level. The robot controller preferably is equipped also to interpret a respective command for defining the parameter values behind each style.

According to a further embodiment of the invention, the robot controller is equipped to interpret a dedicated command of the robot program for determining exact movement speed and course of the movement between consecutive coordinates, while considering the selected set of parameters. This could be for example a command such as "SmoothMove xyz1, xyz2, v500", wherein the xyz1 is representing the start coordinate of a section of the movement path, xyz2 the end coordinate and v500 a desired movement speed. Such a command is preferably adapted to the syntax of the further command library of the robot controller, which comprises for example also a command "MoveL xyz1, xyz2, v500" for linear interpolation inbetween start and end coordinates of the section of the movement path.

This enables for example to release only selected sections of the movement path for increasing the comfort level of the human collaborative worker, wherein other sections are fixed and not subject to become adapted concerning an increased comfort level. Not increasing the comfort level is useful for example for those sections of a movement path which is more distant from the human collaborative worker, so that there might be no significant influence of those sections on the individual comfort level.

According to a further embodiment of the invention, a set of parameters describes at least one of the following aspects:
acceleration ramps, stopping behavior,
velocity profiles, minimal/maximal speeds of robot arm,
movement path geometry/alternative movement path geometries.

These parameters have direct influence on the movement path or on the movement speed and are suitable parameters for the individual adaptation of the comfort level of the human collaborative worker.

According to a further embodiment of the invention, a set of parameters describes additionally at least one of the following aspects:
jerk levels,
robot pose or configuration,
closest distance robot arm⇔collaborative human worker along movement path.

These parameters have indirect influence on the movement path or on the movement speed and are also suitable parameters for the individual adaptation of the comfort level of the human collaborative worker.

A robot typically provides 6 degrees of freedom in movement. Thus, each coordinate within its working range (3 degrees of freedom in movement) might be reached in each orientation (further 3 degrees of freedom in movement). Assuming that the orientation of the tip of the robot arm is only of importance at the start and end of respective sections of a movement path, a certain orientation has not necessarily to be observed in the region in between. Thus, in the region in between, a certain degree of redundancy in freedom of movement is available, which can be used to avoid robot poses which might be perceived as threatening by a human collaborative worker.

According to a further embodiment of the invention, a set of parameters describes additionally at least one of the following aspects, which are related to a disabled or aged collaborative human worker:
  limited range of reach of the collaborative human worker,
  increased need of time for action, reaction or motion of the collaborative human worker,
  impaired vision or hearing of the collaborative human worker.

In case of a limited range of reach of a human worker, for example, a transfer point where the robot shall hand over a workpiece to a human collaborative worker might be automatically shifted to a height which is agreeable for this human. In case of a need for more reaction time of the collaborating human, additional waiting time between consecutive working steps might be provided. In case that an action is required by the human collaborative worker, additional optical or acoustical signals initiated by the robot controller might facilitate the overall collaboration.

According to a further embodiment of the invention, the robot controller is equipped to determine a characteristic value which describes how demanding a collaborative task is based on a respective set of parameters. This is useful, for example, to get an overall view on the settings of a respective parameter set and on how demanding the parameter set is.

According to another embodiment of the invention, said characteristic value is defined as an arithmetic or geometric average of the normalized parameters of the respective parameter set. Normalization means that the range between lower and upper limits of a respective parameter is scaled into a range between 0 and 1. Thus each parameter value will also be in the range of 0 to 1. An arithmetic or geometric average of all parameters will also be within this range, wherein 0 means that the parameter set is minimally demanding and wherein 1 means that the parameter set is maximally demanding. Which value is felt as most comfortable depends on the individual perception of each human collaborative worker.

According to a further variant of the invention the robot controller is equipped to adjust one of more of the parameters in the currently active respectively selected parameter set so as to achieve an intended change in the characteristic value describing the level of demand of the collaborative task. For example a human worker feels not as well on one day and he gives a respective user input to the robot controller, that the level of demand shall become reduced by 10%. Thus the characteristic style of the respective worker is still the same, but those parameters, which are reflecting his individual needs, are adapted accordingly.

According to another variant of the invention, the robot controller is equipped to exchange a sequence of independent sections of the movement path defined in the robot program in order to increase the comfort level of a respective collaborative human worker. At the end of the collaborative task, all working steps have been executed as defined in the robot program, but due to the change of sequences, the required movements of the human collaborative worker between the sequences might be felt as more comfortable. This might be the case if, for example, a bending down movement of the human worker is thereby avoided or reduced.

According to a further embodiment of the invention, the robot controller is equipped to determine an alternative course of the movement path between non-consecutive coordinates on the movement path, wherein at least one coordinate of the sequence of coordinate data in between is not taken into account. This might be useful, for example, if a minimum distance of the robot to the human collaborative worker is required and avoidance of a certain area around the human is required. Thus, not all given coordinates along the predefined movement path can be observed necessarily.

According to a further embodiment of the invention, the robot controller is equipped to utilize redundant degrees of freedom in the movement of the robot arm when determining exact movement speed and course of the movement path between consecutive coordinates. In case of, for example, a robot with 7 degrees of freedom in movement, the one redundant degree of freedom in movement is provided in any case. This can be used, for example, to avoid poses of the robot that might be perceived as unpleasant or threatening by a collaborative human worker.

In general, it has been found that a pose or movement sequence of a robot is felt to be more agreeable the more it is similar to a typical human pose or movement sequence, wherein the robot arm is comparable with the arm of a human. Especially robots with two independently operating arms that are modeled in analogy to the upper part of a human body are of interest for this embodiment and other embodiments of the invention.

According to a further embodiment of the invention, a vision system is provided to observe the collaborative human worker within the working range of the robot arm and to provide respective data to the controller. This embodiment is useful, for example, if a minimum distance of the human worker to the robot has to be observed. Thus, the actual position of the human can be recognized and provided as a further input parameter for determining a respective movement path of the robot arm in a respective distance to the human worker.

According to a further embodiment of the invention, a robot with preferably two inherently safe robot arms is provided. As mentioned before, such a robot is rather similar to the upper body of a human and is suitable to perform movement sequences which are similar to those of a human. The acceptance of such a robot by the human collaborating worker and his comfort level will become increased therewith. An inherently safe robot lacks the physical power to harm a human. Thus, no further safeguarding measures are required, which could restrict the movements of such a robot. A more human-like movement behavior of such a robot is facilitated therewith.

The objective of the invention is also solved by a method for controlling a robot system for collaborative robot applications, comprising a movable robot arm and a controller wherein the controller is equipped to control the movement of the distal end of the robot arm along a movement path according to at least a sequence of coordinate data and respective commands of a robot program and wherein the controller is equipped to determine exact movement speed and course of the movement path between consecutive coordinates according to a set of parameters, which is characterized by the following steps:

providing at least two alternatively selectable sets of parameters which both are related to a respective individual comfort level of a respective collaborative human worker, selecting one of the parameter sets, controlling the movement of the distal end of the robot arm along a movement path according to at least a sequence of coordinate data and respective commands of a robot program determining exact movement speed and course of the movement path between consecutive coordinates according to the selected set of parameters.

The advantages of such a method correspond to those of the robot system according to the invention as explained before.

Further advantageous embodiments of the invention are mentioned in the dependent claims.

FIG. 1 shows an exemplary robot system for collaborative applications 10. A Robot with two independently operable robot arms 12, 14 and a robot base 16 is connected to a robot controller 18 by a connection 20. The robot controller 18 comprises a computing unit which is equipped to run a robot program thereon and further comprises several electrical amplifiers, which are provided to supply the drives of the robot. Dependent on the respective commands of the actual robot program running on the robot controller 18, the distal ends or the tool center points (TCP) of the robot arms 12, 14 will move along a respective predetermined movement path 22.

The movement path 22 is predetermined by respective consecutive coordinates 24 which are defined by coordinate data within the robot program. The robot program further comprises data about a desired speed along the movement path. By applying a set of comfort-related parameters, an intended operational tolerance is gained which enables the robot controller to determine exact movement speed and course of the movement path between consecutive coordinates 24 with respect to individual comfort-related aspects of a respective human collaborative worker 26.

Figure 2:
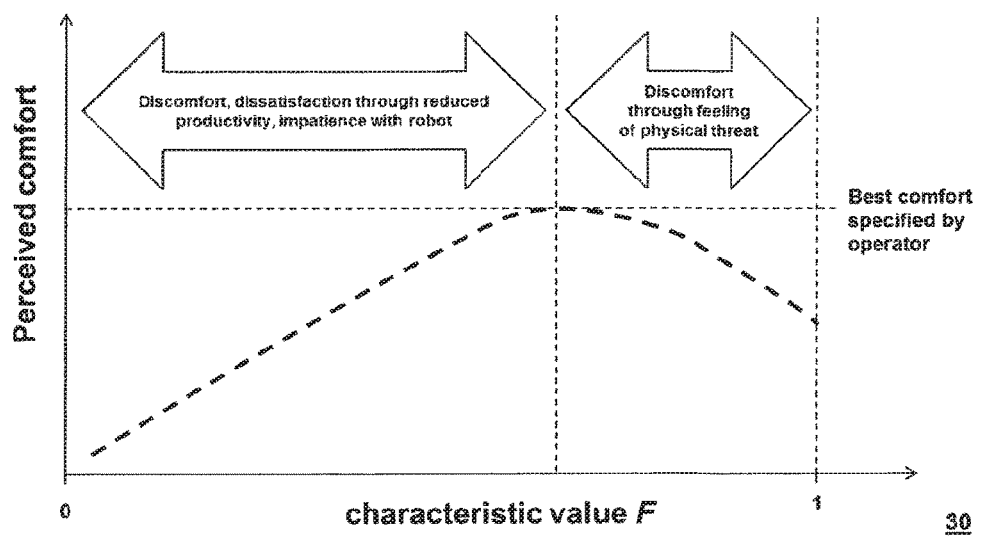
FIG. 2 shows an exemplary dependence of individual perceived comfort level.

FIG. 2 shows an exemplary dependence of individual perceived comfort level in a sketch 30. A characteristic value F is describing how demanding a collaborative task is and is scaled into the range of 0 to 1. The lower limit 0 means the lowest level of demand, in which the robot movement might be as slow as permitted by the parameter set, additional waiting times are included and/or the movement path comprises several detours. The upper limit 1 means the highest level of demand with maximum permitted movement speed and straightforward movement path.

The individual sensation of the comfort level of a human collaborative worker might be rather different. The dotted line shows a typical example, in which the maximum level of individual comfort sensation is between both extremes.

Figures 3, 4:
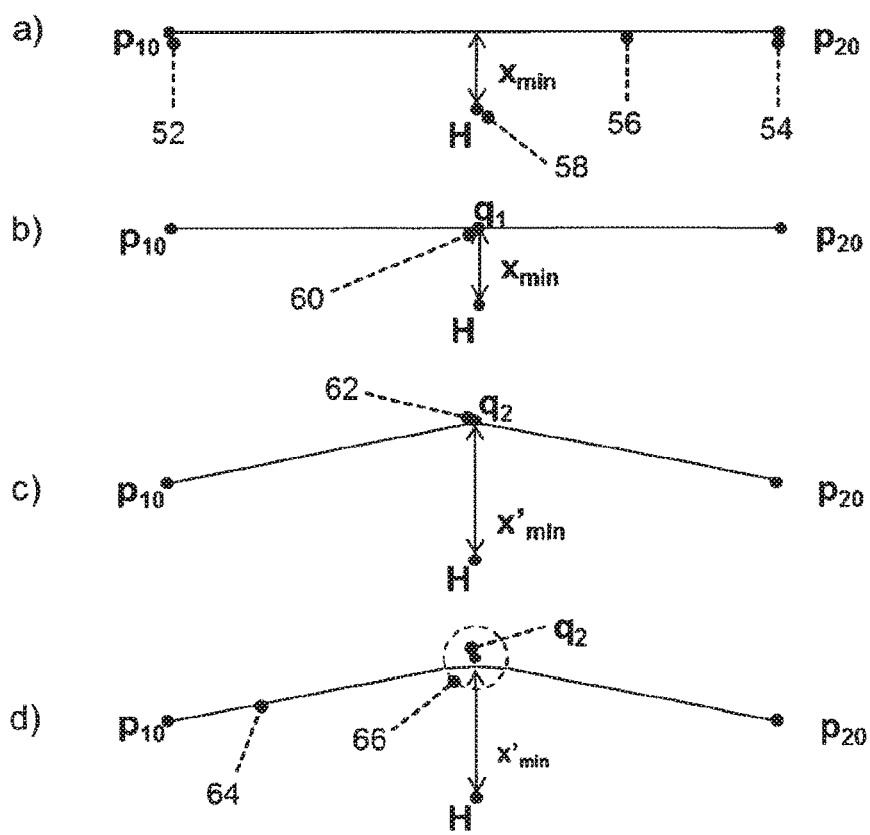
FIG. 3 shows possible definitions of characteristic values describing the individual comfort level.
FIG. 4 shows an exemplary procedure for ensuring minimal distance.

FIG. 3 shows in a sketch 40 possible definitions of a characteristic value F which is describing how demanding a collaborative task is. Both the arithmetic average 42 as well as the geometric average 44 of the values of the relevant comfort-related parameters are a suitable value for a respective description of the overall level of demand.

The value of each respective parameter is normalized to the range of 0 to 1, leading to the respective values $b_i$. Examples are shown for normalizing the acceleration a, a distance x and a velocity v.

FIG. 4 shows an exemplary procedure for ensuring a minimal distance 50 in a sequence of four sketches a)-d). In the first sketch a) a linear section 56 of a movement path inbetween a first coordinate P10, marked with reference sign 52, and a second coordinate P20, marked with reference sign 54, is shown. The coordinate of a human collaborative worker H is marked with reference sign 58. The closest distance of the human worker H to the linear section 56 is marked with the arrow $X_{min}$.

The concrete course of the movement path between first 52 and second 54 coordinates is subject to an operational tolerance, which is the basis for a not shown robot controller to adapt the section of the movement path in order to increase the comfort level of the human worker H. In this case the closest distance $X_{min}$ is on one side safe, but on the other side the human worker H has a reduced sensation of comfort if the robot passes him in this distance. He prefers an increased distance.

In order to increase the comfort level for the human worker H, an alternative bypass section between first 52 and second 54 coordinates is determined. In the second sketch b), an additional coordinate q1, marked with reference sign 60, is added along the linear section at this point, which is closest to the human H.

In the third sketch c), the additional coordinate is adapted in such a way that it is moved away from the human H so that an increased distance $X'_{min}$ is obtained. The adapted coordinate q2 is marked with reference sign 62, wherein the sections between the adapted coordinate q2 and the adjacent first 52 and second 54 coordinates are linear.

In the fourth sketch d), a zone 66 is shown around the coordinate q2. Outside this zone 66 the directions of the adjacent sections aim directly at the coordinate q2 within this zone. Inside this zone a smooth course of the movement path is chosen in order to reduce the acceleration along the curve. So a bypass of the movement path around the human H is gained as indicated with the reference sign 64.

Figure 5:
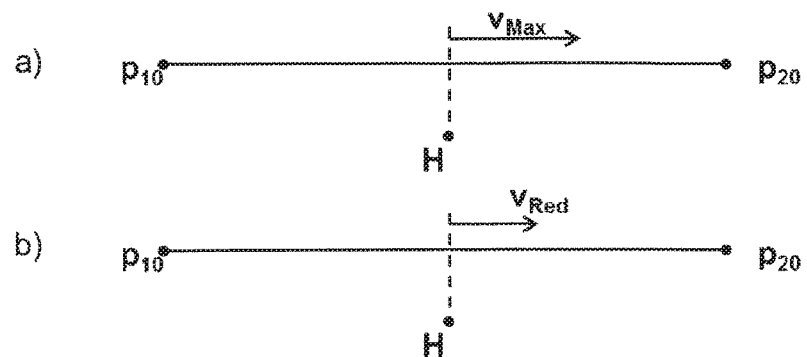
FIG. 5 shows an exemplary procedure for ensuring acceptable speed level.

FIG. 5 is showing a linear section of a movement path inbetween coordinate P10 and P20 in two sketches 70 a) and 70 b). A human worker H is near this section in a safe distance. In the first sketch a) the movement speed of the robot arm along the movement path is set to the maximum speed $V_{max}$, which is defined in a respective robot program. Since the human worker H has a reduced sensation of comfort when the robot arm is passing him with a higher speed, the speed is reduced to $V_{Red}$ in order to increase the individual comfort level as indicated in the sketch b).

Figure 6:
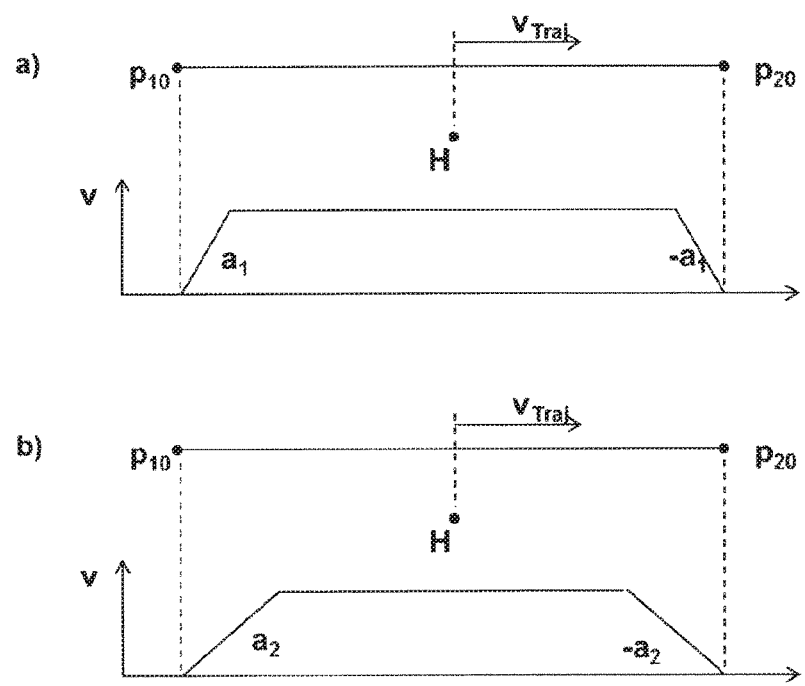
FIG. 6 shows an exemplary procedure for ensuring acceptable acceleration level.

FIG. 6 is showing two variants of a velocity profile of a robot arm along a section of a movement path inbetween a first coordinate P10 and a second coordinate P20 in a sketch 80. A human worker H situated near this section feels no reduction of his individual comfort level for the case that a robot with a given speed is passing him. However, since he feels a reduction of his individual comfort level in the case that the acceleration exceeds a certain value, the acceleration a1 is reduced to a lower acceleration a2, thus improving his comfort level.

FIG. 7 shows an example of the definition of parameter sets in a robot program in a sketch 90. This can be seen as an example of a source code of a robot program.

First, the style parameters are defined so that all relevant parameters which have influence on the comfort level of a human collaborative worker are defined. In this case the following parameters are defined:

minimum distance between TCP (Tool Center Point) and operator,
    maximum velocity of TCP,
    maximum acceleration,
    maximum jerk,
    maximum joint velocity.

Of course any other combination of further parameters is thinkable. Three example styles are defined, the first for normal operation with the highest degree of demand, the second is an individual style for a first human collaborative worker, and the third is an individual style for a second human collaborative worker. The numbers of styles is theoretically unlimited, so an individual style for each worker is applicable.

FIG. 8 shows an example of a definition of motion execution in a robot program in a sketch 100. This can be seen as an example of a source code of a robot program.

A command "ActivateStyle" is provided to select one of the respective comfort-related parameter sets. A command "SmoothMove" is provided to initiate a movement of the robot from a first coordinate (P10) to a second coordinate (P20) wherein an exemplary reference speed of 1000 mm/s is foreseen (v1000) and wherein an exemplary zone of 50 mm (z50) around each coordinate is provided. Outside the zone the course of adjacent sections is aiming directly to the coordinate within this zone. Inside the zone a smooth course of the movement path is chosen in order to reduce acceleration during the curve.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B, and C" should be interpreted as one or more of a group of elements consisting of A, B, and C, and should not be interpreted as requiring at least one of each of the listed elements A, B, and C, regardless of whether A, B, and C are related as categories or otherwise. Moreover, the recitation of "A, B, and/or C" or "at least one of A, B, or C" should be interpreted as including any singular entity from the listed elements, e.g., A, any subset from the listed elements, e.g., A and B, or the entire list of elements A, B, and C.

LIST OF REFERENCE SIGNS 10 exemplary robot system for collaborative applications
12 first robot arm
14 second robot arm
16 robot base
18 robot controller
20 connection
22 movement path
24 coordinates along movement path
26 collaborative human worker
30 exemplary dependence of individual perceived comfort level
40 possible definitions of characteristic values describing the individual comfort level
42 characteristic value based on arithmetic average
44 characteristic value based on geometric average
50 exemplary procedure for ensuring minimal distance
52 first coordinate
54 second coordinate
56 section of movement path inbetween consecutive coordinates
58 coordinate of human worker
60 additional coordinate
62 adapted additional coordinate
64 bypass around coordinate of human worker
66 zone around adapted additional coordinate
70 exemplary procedure for ensuring acceptable speed level
80 exemplary procedure for ensuring acceptable acceleration level
90 example for definition of parameter sets in robot program
100 example for definition of motion execution in robot program

The invention claimed is:

1. A robot system for one or more collaborative robot applications, the system comprising:
a movable robot arm; and
a controller,
wherein the controller is configured to control movement of a distal end of the robot arm along a movement path according to at least a sequence of coordinate data and respective commands of a robot program,
wherein the controller is configured to determine exact movement speed and course of the movement path between consecutive coordinates according to a set of parameters, and
wherein at least two alternatively selectable sets of parameters are provided, each alternatively selectable set of parameters corresponding to a respective individual comfort level selected by a respective collaborative human worker.

2. The system of claim 1, wherein respective parameters are provided to adopt a value within a given lower and a given upper limit.

3. The system of claim 1, wherein the controller is configured to interpret a dedicated command of the robot program for selecting a respective set of parameters.

4. The system of claim 1, wherein the controller is configured to interpret a dedicated command of the robot program for determining exact movement speed and course of the movement between the consecutive coordinates.

5. The system of claim 1, wherein a set of parameters describes at least one of:
acceleration ramps, stopping behavior;
velocity profiles, minimal/maximal speeds of the moveable robot arm;
movement path geometry/alternative movement path geometries.

6. The system of claim 5, wherein a set of parameters describes additionally at least one of:
jerk levels;
robot pose or configuration;
a closest distance between the movable robot arm and a collaborative human worker along the movement path.

7. The system of claim 5, wherein a set of parameters describes additionally at least one of:

limited range of reach of the collaborative human worker;
increased need of time for action, reaction or motion of the collaborative human worker;
impaired vision or hearing of the collaborative human worker,
wherein the collaborative human worker is disabled or aged.

8. The system of claim 5, wherein the controller is configured to determine a characteristic value which is describing how demanding a collaborative task is based on a respective set of parameters.

9. The system of claim 8, wherein the characteristic value is defined as an arithmetic or geometric average of the normalized parameters of the respective parameter set.

10. The system of claim 8, wherein the controller is configured to adjust one of more of the parameters in a currently active parameter set so as to achieve an intended change in the characteristic value describing the level of demand of the collaborative task.

11. The system of claim 1, wherein the controller is configured to exchange a sequence of independent sections of the movement path defined in the robot program in order to increase the comfort level of a respective collaborative human worker.

12. The system of claim 1, wherein the controller is configured to determine an alternative course of the movement path between non-consecutive coordinates on the movement path,
wherein at least one coordinate of the sequence of coordinate data in-between is not taken into account.

13. The system of claim 1, wherein the controller is configured to utilize redundant degrees of freedom in movement of the moveable robot arm when determining exact movement speed and course of the movement path between consecutive coordinates.

14. The system of claim 1, further comprising:
a vision system configured to observe the collaborative human worker within a working range of the robot arm, wherein the vision system is configured to provide respective data to the controller.

15. The system of claim 1, comprising two inherently safe robot arms.

16. A method for controlling a robot system for collaborative robot applications, the robot system including a movable robot arm and a controller, wherein the controller is configured to control a movement of the distal end of the robot arm along a movement path according to at least a sequence of coordinate data and respective commands of a robot program and wherein the controller is configured to determine exact movement speed and course of the movement path between consecutive coordinates according to a set of parameters, the method comprising:
providing at least two alternatively selectable sets of parameter, each alternatively selectable set of parameters corresponding to a respective individual comfort level selected by a respective collaborative human worker;
selecting one of the parameter sets;
controlling the movement of the distal end of the robot arm along the movement path according to at least the sequence of coordinate data and respective commands of the robot program; and
determining the exact movement speed and course of the movement path between the consecutive coordinates according to the selected set of parameters.

* * * * *